United States Patent
Lee et al.

(10) Patent No.: US 7,779,479 B2
(45) Date of Patent: Aug. 17, 2010

(54) METHOD AND APPARATUS FOR PLAYING BACK CONTENT BASED ON DIGITAL RIGHTS MANAGEMENT BETWEEN PORTABLE STORAGE AND DEVICE, AND PORTABLE STORAGE FOR THE SAME

(75) Inventors: Byung-rae Lee, Yongin-si (KR); Yun-sang Oh, Seoul (KR); Tae-sung Kim, Seoul (KR); Kyung-im Jung, Seongnam-si (KR); Shin-han Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1329 days.

(21) Appl. No.: 11/141,328

(22) Filed: Jun. 1, 2005

(65) Prior Publication Data

US 2005/0268346 A1    Dec. 1, 2005

Related U.S. Application Data

(60) Provisional application No. 60/575,757, filed on Jun. 1, 2004.

(30) Foreign Application Priority Data

Jun. 1, 2004    (KR) ...................... 10-2004-0039662

(51) Int. Cl.
G06F 7/04    (2006.01)
(52) U.S. Cl. .......................................... 726/27; 726/26
(58) Field of Classification Search .................. 726/26, 726/27
See application file for complete search history.

(56) References Cited

U.S. PATENT DOCUMENTS

| 6,697,944 | B1 |  | 2/2004 | Jones et al. |
|---|---|---|---|---|
| 6,775,655 | B1 | * | 8/2004 | Peinado et al. ................ 705/59 |
| 7,263,188 | B2 | * | 8/2007 | Kohno ......................... 380/231 |
| 7,278,165 | B2 | * | 10/2007 | Molaro .......................... 726/27 |
| 2003/0046567 | A1 | * | 3/2003 | Carman ...................... 713/193 |
| 2003/0120928 | A1 | * | 6/2003 | Cato et al. .................... 713/176 |
| 2003/0194092 | A1 | * | 10/2003 | Parks et al. ................... 380/281 |
| 2003/0217279 | A1 | * | 11/2003 | Fuchigami et al. ........... 713/189 |
| 2004/0088541 | A1 | * | 5/2004 | Messerges et al. ........... 713/156 |
| 2005/0022025 | A1 | * | 1/2005 | Hug ............................. 713/201 |
| 2005/0091508 | A1 | * | 4/2005 | Lee et al. ..................... 713/182 |
| 2005/0216763 | A1 | * | 9/2005 | Lee et al. ..................... 713/200 |

FOREIGN PATENT DOCUMENTS

WO    WO 2005/001599 A2    1/2005

* cited by examiner

Primary Examiner—Kambiz Zand
Assistant Examiner—Teshome Hailu
(74) Attorney, Agent, or Firm—Sughrue Mion, PLLC

(57) ABSTRACT

A method of playing back content based on digital rights management (DRM) between a portable storage and a device and a portable storage for the same are provided. The method of playing back content using a portable storage includes requesting the portable storage to transmit a right to play back content protected through digital rights management (DRM), receiving the right to play back the content protected through DRM from the portable storage, and informing the portable storage of completion of the playback when a playback of the content protected through DRM using the right is completed.

37 Claims, 9 Drawing Sheets

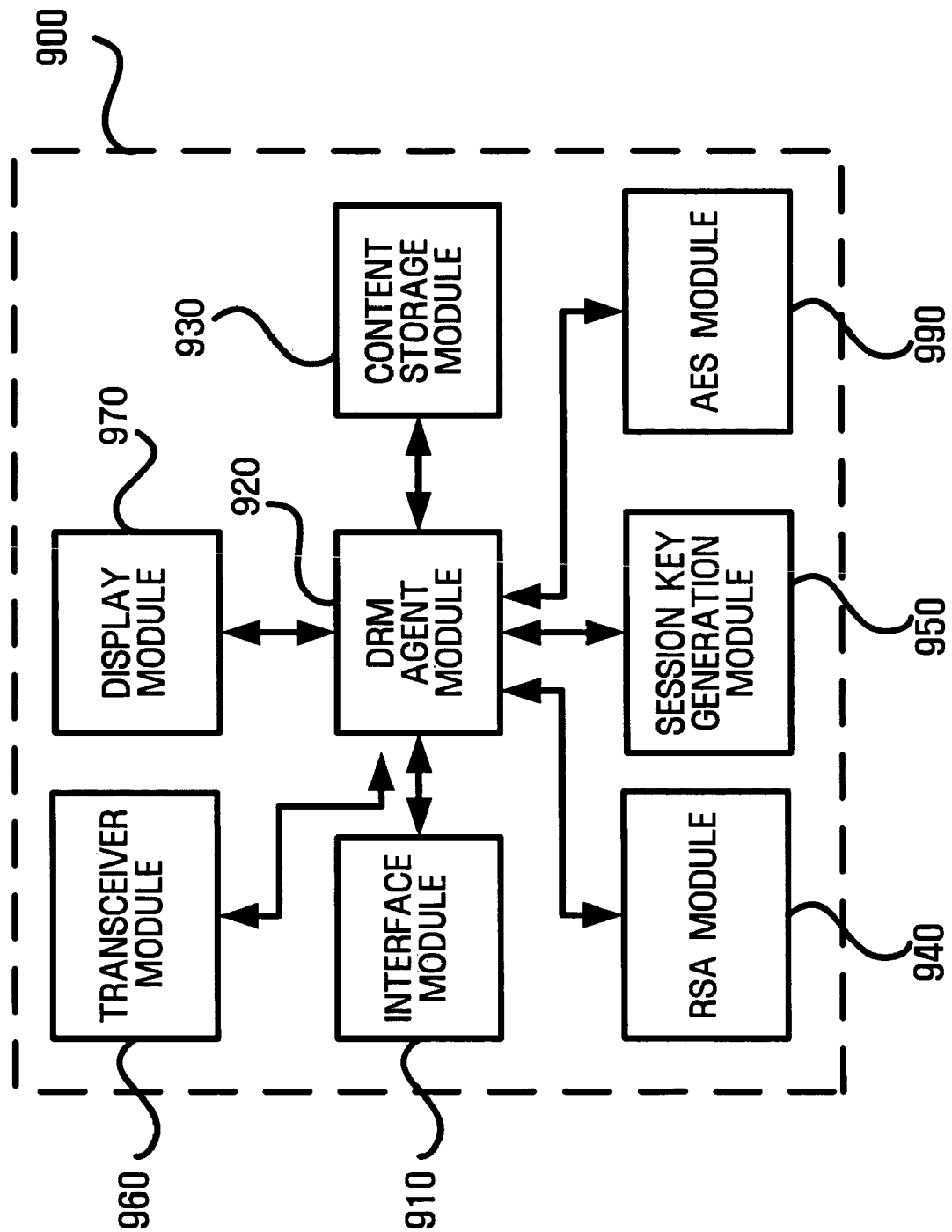

METHOD AND APPARATUS FOR PLAYING BACK CONTENT BASED ON DIGITAL RIGHTS MANAGEMENT BETWEEN PORTABLE STORAGE AND DEVICE, AND PORTABLE STORAGE FOR THE SAME

CROSS-REFERENCE TO RELATED APPLICATIONS

This application claims priority from Korean Patent Application No. 10-2004-0039662 filed on Jun. 1, 2004 in the Korean Intellectual Property Office, and U.S. Provisional Patent Application No. 60/575,757 filed on Jun. 1, 2004 in the United States Patent and Trademark Office, the disclosures of which are incorporated herein by reference in their entirety.

BACKGROUND OF THE INVENTION

1. Field of the Invention

Apparatuses and methods consistent with the present invention relate to a digital rights management (DRM), and more particularly, to playing back content based on DRM between a portable storage and a device, and the portable storage for the same.

2. Description of the Related Art

Recently, DRM has been actively researched and developed. Commercial services using DRM have already been used or will be used. DRM needs to be used because of the following various characteristics of digital content. That is to say, unlike analog data, digital content can be copied without loss and can be easily reused, processed, and distributed, and only a small amount of cost is needed to copy and distribute the digital content. However, a large amount of cost, labor, and time are needed to produce the digital content. Thus, when the digital content is copied and distributed without permission, a producer of the digital content may lose profit, and the producer's enthusiasm for creation may be discouraged. As a result, development of digital content business may be hampered.

There have been several efforts to protect digital content. Conventionally, digital content protection has been concentrated on preventing non-permitted access to digital content, permitting only people paid charges to access the digital content. Thus, people who paid charges for the digital content are allowed to access unencrypted digital content while people who did not pay charges are not allowed to access the unencrypted digital content. However, when a person who paid charges intentionally distributes the digital content to other people who did not pay charges, the digital content can be used by the other people who did not pay charges. To solve this program, DRM was introduced. In DRM, anyone is allowed to freely access encoded digital content, but a license referred to as a rights object (RO) is needed to decode and execute the digital content. Accordingly, the digital content can be more effectively protected by using DRM.

The concept of DRM will be described with reference to FIG. 1. DRM relates to management of contents (hereafter, referred to as encrypted contents) protected using a method such as encryption or scrambling and ROs allowing access to the encrypted contents.

Referring to FIG. 1, a DRM system includes user devices 110 and 150 wanting to access content protected by DRM, a contents issuer 120 issuing content, a rights issuer 130 issuing an RO containing a right to access the content, and a certification authority 140 issuing a certificate.

In operation, the user device 110 can obtain desired content from the contents issuer 120 in an encrypted format protected by DRM. The user device 110 can obtain a license to play back the encrypted content from an RO received from the rights issuer 130. Then, the user device 110 can play back the encrypted content. Since encrypted contents can be circulated or distributed freely, the user device 110 can freely transmit the encrypted content to the user device 150. The user device 150 needs the RO to play back the encrypted content. The RO can be obtained from the rights issuer 130. Meanwhile, the certification authority 140 issues a certificate indicating that the contents issuer 120 is authentic and the user devices 110 and 150 are authorized devices. The certificate may be embedded into devices used by the user devices 110 and 150 when the devices are manufactured and may be reissued by the certification authority 140 after a predetermined duration has expired.

DRM protects the profits of those producing or providing digital contents and thus may be helpful in activating the digital content industry. However, there is inconvenience practically in this DRM system although an RO or encrypted content can be transferred between the user devices 110 and 150 using mobile devices. In this situation, ROs and encrypted contents can be easily moved between devices when a portable storage is used. In other words, a method that enables a device to use an RO stored in a portable storage to access content protected through DRM is desired.

SUMMARY OF THE INVENTION

The present invention provides a method of playing back content protected through DRM using a device and a portable storage.

The present invention also provides a portable storage and a device for performing the method.

According to an aspect of the present invention, there is provided a method of playing back content using a portable storage, including requesting the portable storage to transmit a right to play back content protected through DRM, receiving the right to play back the content protected through DRM from the portable storage, and informing the portable storage of completion of a playback when the playback of the content protected through DRM using the right is completed.

According to another aspect of the present invention, there is provided a method of sending a right to play back content to a device, the method including receiving a request to transmit the right to play back the content protected through DRM from the device, transmitting the right to play back the content protected through DRM to the device in response to the request, and receiving a command to update an RO for the content protected through DRM.

According to still another aspect of the present invention, there is provided a portable storage including an interface module for connection with a device, an RO storage module storing at least one encrypted rights object, an encryption module generating a session key and performing symmetric-key encryption and public-key encryption, and a DRM agent module performing DRM operations, wherein the DRM agent module finds an RO for content among rights objects stored in the RO storage module upon receiving a request to transmit a right to play back the content from the device through the interface module, encrypts information needed to play back the content among information comprised in the RO using the encryption module, and sends the encrypted information to the device through the interface module.

According to yet another aspect of the present invention, there is provided an apparatus for playing back content using a portable storage, the apparatus including an interface module for connection with the portable storage, a content storage module storing at least one content protected through DRM, an encryption module generating a session key and performing symmetric-key encryption and public-key encryption, and a DRM agent module performing DRM operations, wherein the DRM agent module requests a right to play back content that is protected through DRM and stored in the content storage module from the portable storage via the interface module, receives an encrypted right to play back the content from the portable storage, decrypts the encrypted right to play back the content using the encryption module, and obtains a content encryption key.

BRIEF DESCRIPTION OF THE DRAWINGS

The above and other aspects of the present invention will become more apparent by describing in detail exemplary embodiments thereof with reference to the attached drawings in which:

FIG. 9 is a block diagram of a device according to an exemplary embodiment of the present invention.

DETAILED DESCRIPTION OF EXEMPLARY EMBODIMENTS OF THE INVENTION

Figure 1:
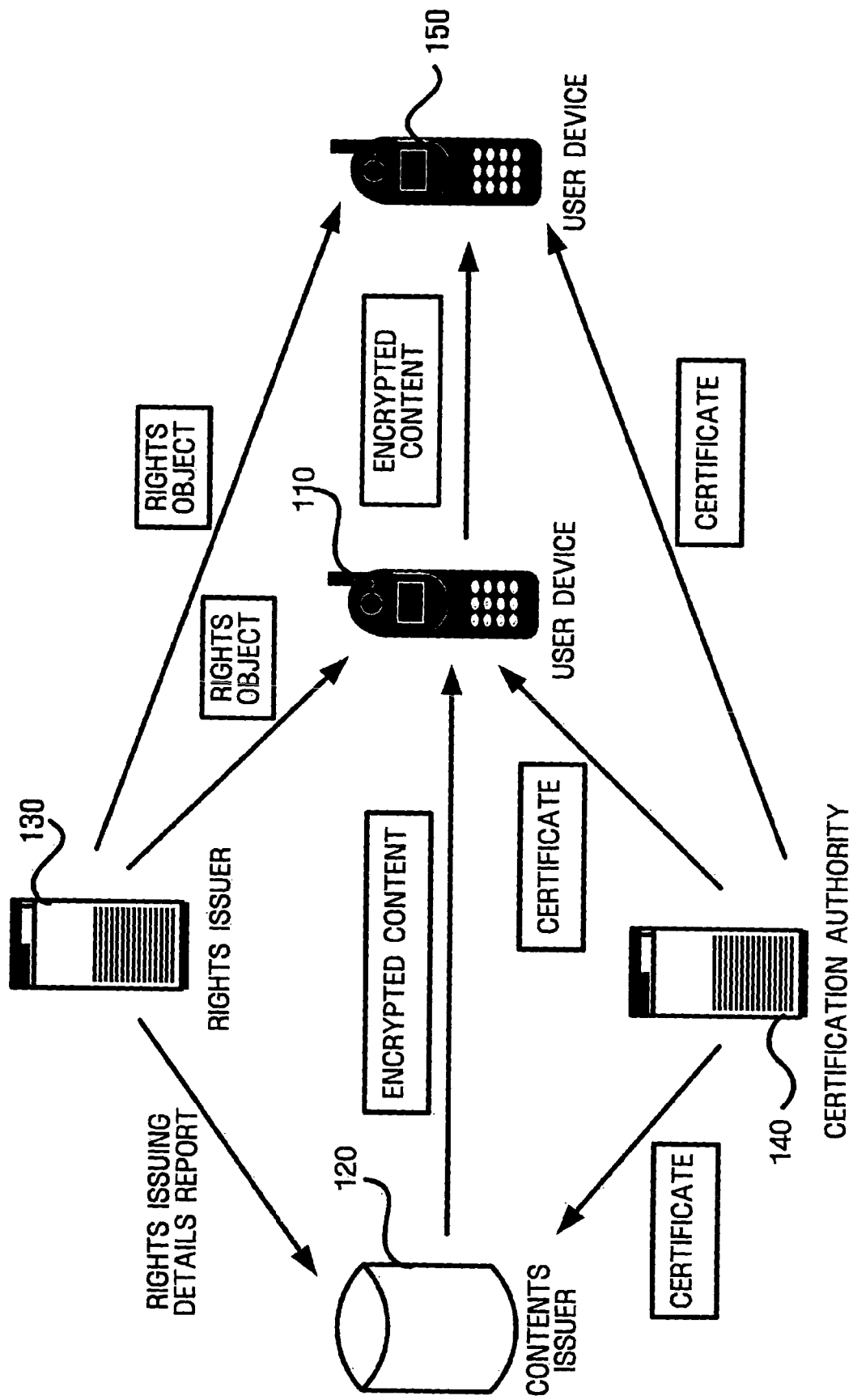
FIG. 1 is a conceptual diagram of DRM.

The present invention will now be described more fully with reference to the accompanying drawings, in which exemplary embodiments of the invention are shown.

Several terms used herein will first be described in a brief manner for better understanding of the present description. Thus, it should be noted that this description will not be interpreted to limit the protection scope of the present invention as far there is no express limitation on them.

Public-Key Cryptography

This is also referred to as asymmetric cryptography because encryption is made when a key used in decrypting data and a key used in encrypting the data constitute different encryption keys.

In public-key cryptography, an encryption key consists of a pair of a public key and a private key. The public key is not necessary to be kept in secret, i.e., the public is easily accessible thereto while the private key must be known only to a specific device. This public key encryption algorithm has been disclosed to the general public but a third person cannot know or hardly know the original content with encryption algorithm, encryption key and ciphered text. There are examples of public key encryption algorithm such as Diffie-Hellman, RSA, El Gamal, Elliptic Curve, etc. In the public key encryption method, as data encryption speed is approximately 100 to 1,000 times slower than in the symmetric key encryption method, it is primarily used for key exchange or digital signature, etc., rather than for encryption of content itself.

Symmetric-Key Cryptography

This is also referred to as secret key cryptography, wherein encryption is made when a key used to encrypt data and a key used to decrypt the data constitute the same encryption key.

As an example of such symmetric key encryption, data encryption standard (DES) method is used most generally, but application adopting advanced encryption standard (AES) method has recently been increased.

Certificate

A certification authority certifies users of a public key with respect to a public-key cipher. A certificate is a message containing a public key and a person's identity information which are signed by the certification authority using a private key. Accordingly, the integrity of the certificate can be easily considered by applying the public key of the certification authority to the certificate, and therefore, attackers are prevented from modulating a user's public key.

Digital Signature

A digital signature is generated to indicate that a document has been written by a genuine signer. Examples of a digital signature are an RSA digital signature, an ElGamal digital signature, a DSA digital signature, and a Schnorr digital signature. When the RSA digital signature is used, a sender encrypts a message with his/her private key and sends the encrypted message to a recipient. The recipient decrypts the encrypted message. In this case, it is proved that the message has been encrypted by the sender.

Random Number

A random number is a sequence of numbers or characters with random properties. Since it costs a lot to generate a complete random number, a pseudo-random number may be used.

Portable Storage Device

A portable storage device used in the present invention includes a non-volatile memory such as a flash memory which data can be written to, read from, and deleted from and which can be connected to a device. Examples of such portable storage device are smart media, memory sticks, compact flash (CF) cards, xD cards, and MMCs. Hereinafter, a secure MMC will be explained as a portable storage device.

DRM Agent

A DRM agent is an entity that manages permissions for media objects of a device within the device or a secure MMC.

Figure 2:
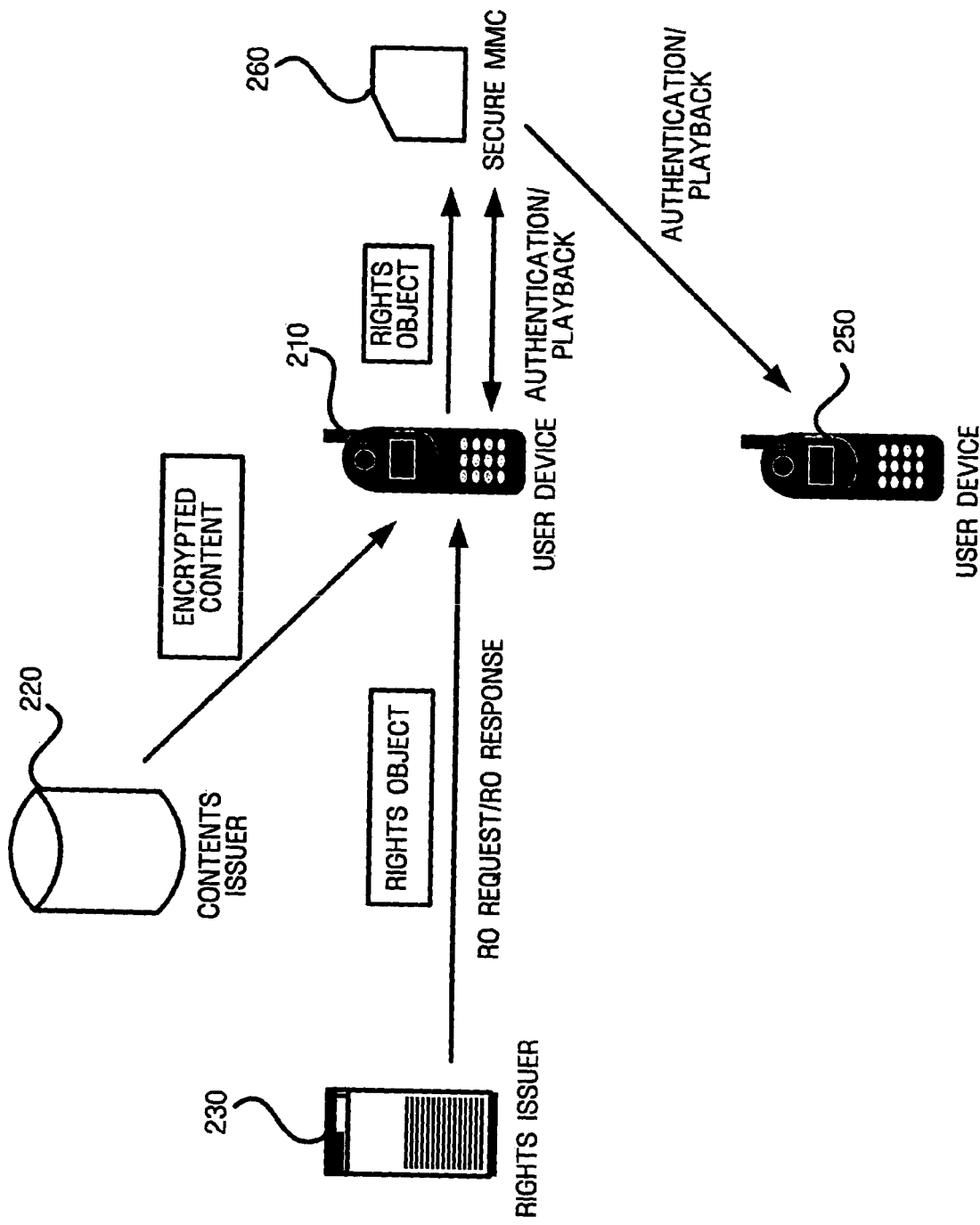
FIG. 2 is a schematic diagram illustrating the concept of a digital right in an exemplary embodiment of the present invention.

FIG. 2 is a schematic diagram illustrating the concept of a digital right according to an exemplary embodiment of the present invention.

A user device 210 can obtain encrypted content from a contents issuer 220. The encrypted content is content protected through DRM). To play back the encrypted content, RO for the encrypted content is needed. an RO contains a definition of a right to content, constraints to the right, and a right to the RO itself. An example of the right to the content may be a playback. Examples of the constraints may be the number of playbacks, a playback time, and a playback duration. Although not shown in FIG. 2, a move or a copy may be the right to the RO.

After obtaining the encrypted content, the user device 210 may request an RO from a rights issuer 230 to obtain a right to play back. When the user device 210 receives the RO together with an RO response from the rights issuer 230, the user device 210 can play back the encrypted content using the RO. Meanwhile, the user device 210 may transfer the RO to a user device 250 having a corresponding encrypted object via a portable storage. The portable storage may be a secure MMC 260 having a DRM function. In this case, the user device 210 performs authentication with the secure MMC 260 and then moves the RO to the secure MMC 260. To play back the encrypted content, the user device 210 requests a right to play back from the secure MMC 260 and receives the right to play back the encrypted content from the secure MMC 260. The user device 210 can play back the encrypted content using the right to play back (i.e., a content encryption key). Meanwhile, after performing the authentication with the user device 250, the secure MMC 260 allows the user device 250 to play back the encrypted content. Here, the authentication between the secure MMC 260 and the user device 250 is essential. A procedure in which the user devices 210 and 250 plays back contents, which are protected through DRM, using ROs stored in the secure MMC 260 will be described with reference to FIG. 3.

Figure 3:
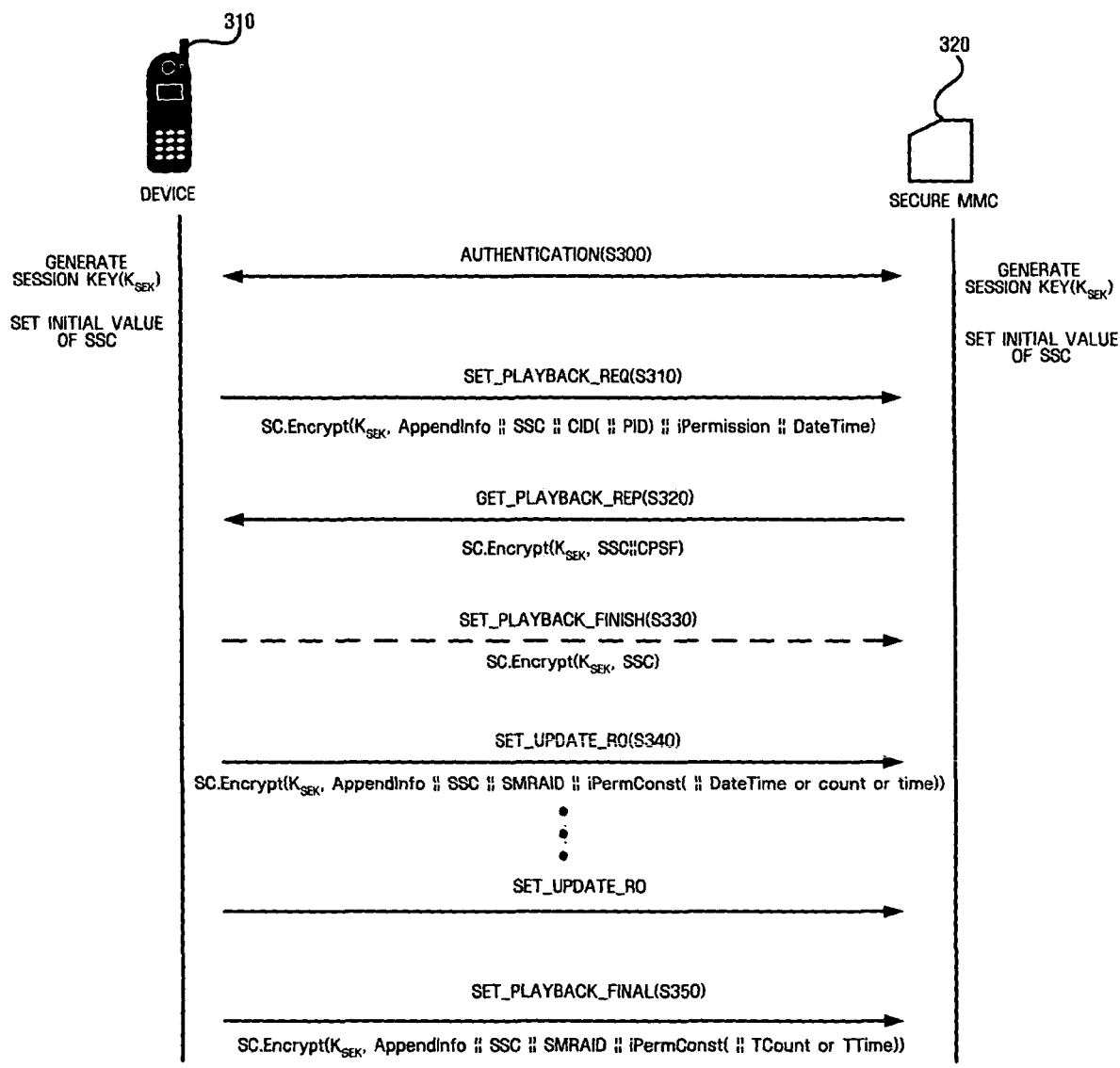
FIG. 3 illustrates a method of playing back content according to an exemplary embodiment of the present invention.

FIG. 3 illustrates a method of playing back content according to an exemplary embodiment of the present invention. In FIG. 3, "SC.Encrypt($K_{SEK}$, A)" indicates that a value of "A" has been encrypted using $K_{SEK}$ according to symmetric-key encryption. "AppendInfo" indicates information regarding succeeding data (e.g., the number of data fields or the length of a data field) when the length of the data is variable.

A device 310 can play back encrypted content using an RO stored in a secure MMC 320. The RO may be obtained from the device or other devices. Alternatively, the secure MMC 320 may be manufactured to have the RO.

To play back the encrypted content, in operation S300, authentication should be performed between the device 310 and the secure MMC 320. During the authentication, each of the device 310 and the secure MMC 320 receives each other's certificate and determines whether the other is an authentic device (or program) by verifying the certificate. For example, the secure MMC 320 may receive a device certificate$_H$ from the device 310, verify that the device 310 is an authentic device (or program), and obtain a device public key$_H$. Similarly, the device 310 may receive a secure MMC certificates from the secure MMC 320, verify that the secure MMC 320 is an authentic device (or program), and obtain a secure MMC public key$_S$.

During the authentication, one of the device 310 and the secure MMC 320 may generate a random number, encrypt the random number using the other's public key, and transmit the encrypted random number. Here, the random number may be used as a session key $K_{SEK}$. For example, the device 310 generates a random number$_H$, encrypts the random number$_H$ using the secure MMC public key$_S$, and transmits the encrypted random number$_H$ to the secure MMC 320. Then, the secure MMC 320 decrypts the encrypted random number$_H$ using a secure MMC private key$_S$ related with the secure MMC public key$_S$ to obtain the random number$_H$. The device 310 and the secure MMC 320 may use the random number$_H$ as the session key $K_{SEK}$.

Preferably, but not necessarily, both of the device 310 and the secure MMC 320 may generate random numbers, respectively, and exchange them to increase randomness. In other words, through the authentication, the device 310 and the secure MMC 320 are provided with the random number$_H$ and a random number$_S$. The device 310 and the secure MMC 320 generate the same session keys $K_{SEK}$, respectively, using the random number$_H$ and the random number$_S$. A published algorithm may be used to generate the session key $K_{SEK}$ using two random numbers.

Through the authentication performed in operation S300, the device 310 and the secure MMC 320 share the session key $K_{SEK}$, and the device 310 can play back contents, which are protected through DRM, using ROs stored in the secure MMC 320. In exemplary embodiments of the present invention, to accomplish DRM with excellent security, a send sequence counter (SSC) may be used. The SSC is included in an application protocol data unit (APDU) and increases whenever the APDU is transmitted. For example, if one or more APDUs are intercepted by an unauthorized user, the SSC included in the APDU has discontinuity. In addition, if an unauthorized user inserts an APDU, the SSC also has discontinuity. This will be described in more detail below.

The device 310 and the secure MMC 320 can initialize their SSCs to a number obtained by combining the random number$_H$ and the random number$_S$ acquired through the authentication (S300). For example, when the SSC is two bytes in size, it may be initially set to a combination of the last one byte of the random number$_H$ and the last one byte of the random number$_S$. For example, if the last one byte of the random number$_H$ is "01010101" and the last one byte of the random number$_S$ is "11111110", the SSC is initially set to "0101010111111110". When an initial value of the SSC is obtained using the random number$_H$ and the random number$_S$, randomness can be increased compared to when the SSC is initially set to "0000000000000000", and therefore, the DRM procedure can be performed more securely.

When the device 310 issues a DRM command to the secure MMC 320, the SSC is included in an APDU. If 10 APDUs are transmitted for the DRM command, the SSC increases by one from the initial value "0101010111111110" whenever each APDU is transmitted. Then, the secure MMC 320 checks the SSC and determines whether an inauthentic APDU is inserted during transmission or an authentic APDU is intercepted.

Even where the MMC 520 sends a DRM command to the device 510, the send sequence counter is included in the APDU (S140). In an exemplary embodiment, the initial value originally initialized is used as the initial value of the send sequence Counter. For example, if a total of 10 APDU are transmitted, the send sequence counter will be incremented by one per an APDU starting from the initial value of 0101010111111110. In another exemplary embodiment, the initial value of the send sequence counter will be based on a value of the Send Sequence Counter finally sent. For example, when the value of the final send sequence counter value is 1000000000000000, the send sequence counter value inserted the next APDU starts from 1000000000000001. Then, the device 310 checks the SSC and determines whether an inauthentic APDU is inserted during transmission or an authentic APDU is intercepted.

Sequentially increasing the SSC is just an example. The SSC may be decreased sequentially or increased or decreased by a value other than 1, without departing from the spirit and scope of the present invention.

Hereinafter, in exemplary embodiments of the present invention, even through it is not particularly described, data to be transmitted and an SSC may be encrypted and included in an APDU transmitted between a device and a secure MMC.

A procedure for playing back content protected through DRM will be performed through operations S310 through S350.

In operation S310, the device 310 may request to prepare for a Playback right by transmitting a SET_PLAYBACK_REQ APDU to the secure MMC 320. In an exemplary embodiment of the present invention, the requested Playback right is not an RO itself but is a simplified object needed to play back the content protected through DRM.

Information transmitted using the SET_PLAYBACK_REQ APDU is content identifier (CID), iPermission, and DateTime. The CID is an identifier (ID) of the content to be played back, and the DateTime indicates the current time of the device 310. The iPermission is an index flag of permission defined in an open mobile alliance (OMA) DRM v2.0. The iPermission has one byte in size and excludes an Export permission. A bit b0 expresses a Play permission. A bit b1 expresses a Display permission. A bit b2 expresses an Execute permission. A bit b3 expresses a Print permission. Bits b4 through b7 are not used but are reserved. When each of the permission bits b0 through b7 has a value of "1", the corresponding permission is set. However, each permission bit has a value of "0", the corresponding permission is not set. A plurality of permission may be requested simultaneously. In addition, in a subscription business model, if the device 310 does not have a parent RO but has only a child RO, the SET_PLAYBACK_REQ APDU may include a PID indicating the ID of the parent RO to searching the parent RO in the secure MMC 320.

In operation S320, the device 310 may request the secure MMC 320 to transmit the Playback right by transmitting a GET_PLAYBACK_REP APDU to the secure MMC 320. Upon receiving the GET_PLAYBACK_REP APDU, when a plurality of ROs corresponding to the CID designated in operation S310 are present, the secure MMC 320 transmits all Playback rights corresponding to the ROs to the device 310. The Playback rights are transmitted in the form of permission information. The format of the permission information will be described later with reference to FIGS. 5 through 7.

After receiving the response to the GET_PLAYBACK_REP APDU from the secure MMC 320, the device 310 selects rights therein or in the secure MMC 320 since ROs may be present in the secure MMC 320 and/or the device 310. When the device 310 does not use an RO in the secure MMC 320 but uses an RO therein, in operation S330 the device 310 informs the secure MMC 320 of a setting of playback finish by transmitting a SET_PLAYBACK_FINISH APDU to the secure MMC 320.

When the device 310 uses an RO in the secure MMC 320, in operation S340 the device commands to update the RO by transmitting a SET_UPDATE_RO APDU to the secure MMC 320. The SET_UPDATE_RO APDU may include one among three different data fields, each of which is defined by an iPermConst parameter. The iPermConst is composed of 8 bytes: four bytes are allocated for Play, Display, Execute, and Print, respectively; and four bytes are reserved for future use. In each byte, a bit b0 denotes a count, a bit b1 denotes a timed-count, a bit b2 denotes a DateTime, a bit b3 denotes an Interval, a bit b4 denotes an Accumulate, and bits b5 through b7 are reserved. When each bit has a value of "1", the corresponding constraint is set. When each bit has a value of "0", the corresponding constraint is not set.

When a constraint such as the DateTime or the Interval for an RO is consumed, the DateTime parameter is needed. When a timed-count constraint is consumed, the device 310 transmits the SET_UPDATE_RO APDU after a period of time specified by a timed-count element lapses. Meanwhile, when an Interval constraint is used, the secure MMC 320 logically converts the Interval constraint into the DateTime constraint after receiving the SET_UPDATE_RO APDU.

When a count or a timed-count constraint for the RO is consumed, the data field needs a "count" parameter. The count parameter has a value of one by default. In an exemplary embodiment of the present invention, when the count constraint is consumed again, the device 310 just sends a SET_UPDATE_RO command again. In this case, operations S310 and S320 are not necessary, and therefore, communication overhead between the device 310 and the secure MMC 320 can be reduced.

When an accumulate time constraint for the RO is consumed, a "Time" parameter is needed. The Time parameter is set to 10 seconds by default. The device 310 periodically transmits the SET_UPDATE_RO APDU according to a value set in the Time parameter. For example, when the Time parameter is set to 60 seconds, the device 310 transmits the SET_UPDATE_RO APDU to the secure MMC 320 every 60 seconds during a playback of content to update the RO.

After the playback of the content is finished, in operation S350 the device 310 informs the secure MMC 320 of completion of the playback by transmitting a SET_PLAYBACK_FINAL APDU to the secure MMC 320. The SET_PLAYBACK_FINAL APDU includes information for checking the integrity of the total amount of use of the RO and reports that a Playback function has been completed. "SMRAID" contains an ID of the RO and an ID of an asset. "TCount" indicates a total count, and "TTime" indicates a total amount of time.

Although not shown in FIG. 3, an exemplary embodiment of the present invention includes an operation of checking the activation status of the secure MMC 320. In this operation, the secure MMC 320 is checked whether it is in an activation status for playback related with the DateTime constraint. For example, the device 310 transmits a SET_CARD_STATUS command embedding the random number$_H$ generated by the device 310 to the secure MMC 320. The secure MMC 320 receives the SET_CARD_STATUS command, encrypts the random number$_S$ generated by the secure MMC 320 and the random number$_H$ using the session key $K_{SEK}$, and transmits them to the device 310 in response to a GET_CARD_STATUS command from the device 310. For example, the encrypted random numbers may be transmitted in the form of "random number$_H$ || SC.Encrypt($K_{SEK}$, random number$_H$|| random number$_S$)". The device 310 can verify that the secure MMC 320 is in the activation status by decrypting the random numbers using the session key $K_{SEK}$.

Figure 4:
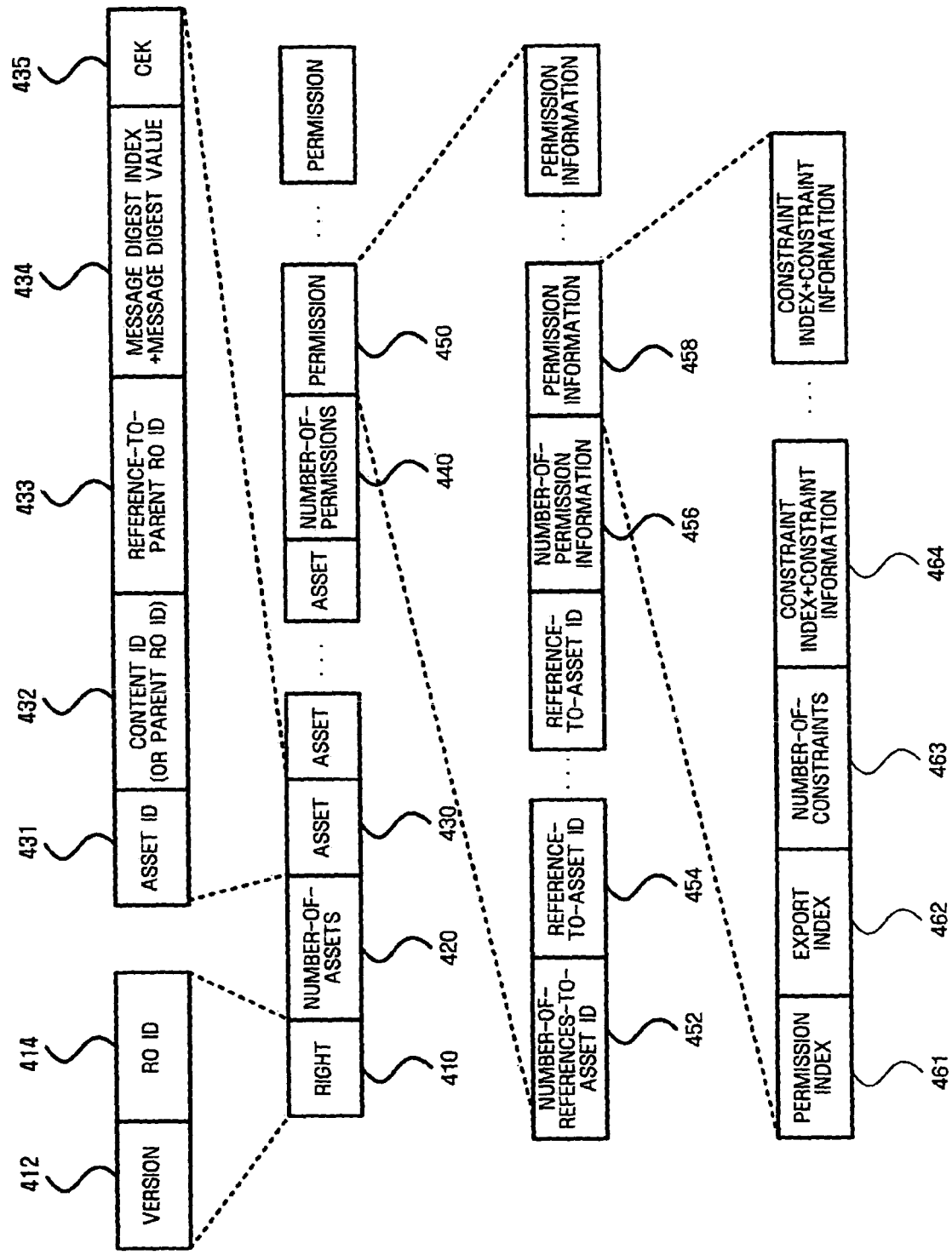
FIG. 4 illustrates a format of an RO used to play back content according to an exemplary embodiment of the present invention.

FIG. 4 illustrates a format of an RO used to play back content, i.e., secure MMC RO format (SMRF), according to an exemplary embodiment of the present invention.

The SMRF includes a Right field 410, an Asset field 430, and a Permission field 450 and may include a plurality of Asset fields and a plurality of Permission fields. Accordingly, a Number-of-assets field 420 indicates the number of Asset fields. A Number-of-permissions field 440 indicates the number of Permission fields.

The Right field 410 includes a Version field 412 containing version information of an RO and an RO ID field 414. The Asset field 430 contains information regarding content data, the consumption of which is managed by the RO. The Permission field 450 contains information regarding an actual usage or action permitted by a rights issuer with respect to the protected content data.

The Asset field 430 includes an Asset ID field 431 for identifying a unique asset, a Content ID (or a Parent RO ID) field 432, a Reference-to-parent RO ID field 433, a Message digest index+message digest value field 434, and a Content encryption key (CEK) field 435. Since a single RO may include a plurality of assets, the Number-of-assets field 420 indicates the number of Asset fields 430.

When the RO is a parent RO, the Parent RO ID field 432 instead of the Content ID field is included. When the RO is a child RO, the Reference-to-parent RO ID field 433 is included.

Here, the parent RO and the child RO are in a relationship in which one RO is defined by inheriting a permission and a constraint from another RO. The parent RO defines a permission and a constraint for DRM content and the child RO inherits them. The child RO refers to the content. However, the parent RO does not directly refer to the content itself but refers to its child RO. When access to the content is permitted according to permission information regarding the child or parent RO, a DRM agent considers a constraint on the permission granting the access and all upper level constraints on the parent and child ROs. As a result, a rights issuer can support a subscription business model.

The Message digest index+message digest value field 434 is provided to protect the integrity of reference to the content. The message digest value is a value generated by a public hash algorithm, e.g., a security hash algorithm1 (SHA1). The message digest index indicates a type of hash algorithm used to generate the message digest value.

The CEK field 435 contains a binary key value used to encrypt the content. The CEK is also a key value used by a device to decrypt the encrypted content. The device can use the content by receiving the CEK from a secure MMC.

Since a single RO may include a plurality of permissions, the Number-of-permissions field 440 indicates the number of Permission fields 450. The Permission field 450 includes a Number-of-references-to-asset ID field 452, a Reference-to-asset ID field 454, or a Number-of-permission information field 456, and a Permission information field 458.

At least one Reference-to-asset ID field 454 may be present in front of the Permission information field 458. A reference to an asset ID refers to the Asset ID field 431.

An RO may have a maximum of seven permissions: a Play permission, a Display permission, an Execute permission, a Print permission, an Export permission, a Copy permission, and a Move permission. The Play permission indicates a right to express DRM content in an audio/video format. A DRM agent does not allow an access based on Play with respect to content such as JAVA games that cannot be expressed in the audio/video format.

The Play permission may optionally have a constraint. If a specified constraint is present, the DRM agent grants a right to Play according to the specified constraint. If no specified constraints are present, the DRM agent grants unlimited Play rights.

The Display permission indicates a right to display DRM content through a visual device. Thus, a DRM agent does not allow an access based on Display with respect to content such as gif or jpeg images that cannot be displayed through the visual device.

The Execute permission indicates a right to execute DRM content such as JAVA games and other application programs. The Print permission indicates a right to generate a hard copy of DRM content such as jpeg images.

The Export permission indicates a right to send DRM contents and corresponding ROs to a DRM system other than an OMA DRM system or a content protection architecture.

The Export permission must have a constraint. The constraint specifies a DRM system of a content protection architecture to which DRM content and its RO can be sent. The Export permission is divided into a move mode and a copy mode. When an RO is exported from a current DRM system to another DRM system, the RO is deactivated from the current DRM system in the move mode but is not deactivated from the current DRM system in the copy mode.

The Move permission is divided into a device-to-secure MMC move and a secure MMC-to-device move. In the device-to-secure MMC move, an RO in a device is sent to a secure MMC and the original RO in the device is deactivated. Similar operations are performed in the secure MMC-to-device move.

The Copy permission is divided into a device-to-secure MMC copy and a secure MMC-to-device copy. In the device-to-secure MMC copy, an RO in a device is sent to a secure MMC, but unlike the Move permission, the original RO in the device is not deactivated. Similar operations are performed in the secure MMC-to-device copy.

The Number-of-permission information field 456 indicates the number of permissions. The Permission information field 458 contains information, such as a constraint, regarding one of the seven permissions.

The permission information field 458 has a structure including a permission index field 461, an export index field 462, a number-of-constraint field 463, and a field 464 of the constraint index+constraint information. The permission index field 461 indicates a type of permission and has one of the values shown in Table 1.

TABLE 1

| Permission name | Permission index |
|---|---|
| All | 0x00 |
| Play | 0x01 |
| Display | 0x02 |
| Execute | 0x03 |
| Print | 0x04 |
| Export | 0x05 |
| Move | 0x06 |
| Copy | 0x07 |

The export index field 462 is used when the permission index indicates Export to identify one of an export using a copy process and an export using a move process.

The permission information field 458 includes information regarding part or all of the constraints shown in Table 2. The constraint information restricts the consumption of digital content. Table 2 shows types of constraints. The field 464 of the constraint index+constraint information has one of the values shown in Table 2 and indicates a type of constraint.

TABLE 2

| Constraint name | Constraint index |
|---|---|
| None | 0x00 |
| Count | 0x01 |
| Time Count | 0x02 |
| Interval | 0x03 |
| Accumulated | 0x04 |
| Datetime | 0x05 |
| Individual | 0x06 |
| System | 0x07 |

A structure of information of the constraint information field may vary according to a value of the field 464 of the constraint index+constraint information.

A Count constraint includes a 2-byte count subfield to specify the count of permissions granted to content. A Time Count constraint includes a count subfield and a timer subfield to specify the count of permissions granted to content during a period of time defined by a timer.

An Interval constraint includes a time subfield having a structure to specify a time interval at which an RO can be executed for corresponding DRM content. An Accumulated constraint specifies a maximum time interval for an accumulated measured period of time while an RO is executed for corresponding DRM content. If the accumulated measured period of time exceeds the maximum time interval specified by the Accumulated constraint, a DRM agent does not permit access to the DRM content with respect to the RO. A Datetime constraint includes two time subfields to specify a duration for a permission and selectively contains a start time or an end time. When the start time is contained, consumption of DRM content is permitted after a specified time and date. When the end time is contained, consumption of the DRM content is permitted by a specified time and date.

An Individual constraint specifies a person to whom DRM content is bound, for example, using a uniform resource identifier (URL) of the person. Accordingly, if a device user's identity is not identical with the identity of the person permitted to use the DRM content, a DRM agent does not permit access to the DRM content. A System constraint specifies a DRM system or a content protection architecture to which content and an RO can be exported. A DRM system version subfield included in the System constraint specifies version information of the DRM system or the content protection architecture. A DRM system subfield included in the system constraint specifies a name of the DRM system or the content protection architecture.

Between a device and an MMC which have authenticated each other, a move or copy of an RO can be performed. Through the move or copy of the RO, the MMC can store the RO. When the RO is stored in the MMC, the device may send a playback request to the MMC to play back encrypted content. When the device plays back the content using the RO stored in the MMC, for example, constraint information set for the RO must be updated.

The update of an RO stored in a portable storage may be performed by a device. In a conventional technique (e.g., when a portable storage is a secure digital (SD) card), to update the RO, the whole RO may be moved from the portable storage to the device. However, when the whole RO is moved whenever the RO is updated, communication overhead occurs between the device and the portable storage. Accordingly, in exemplary embodiments of the present invention, to update a RO, a data format including basic information for identifying the RO and permission information of the RO may be moved.

In addition, according to the present invention, when the device requests to check the permission information of an RO stored in the portable storage, the data format may be moved, thereby reducing communication overhead between the device and the portable storage and rapidly transmitting necessary information.

Figure 5:
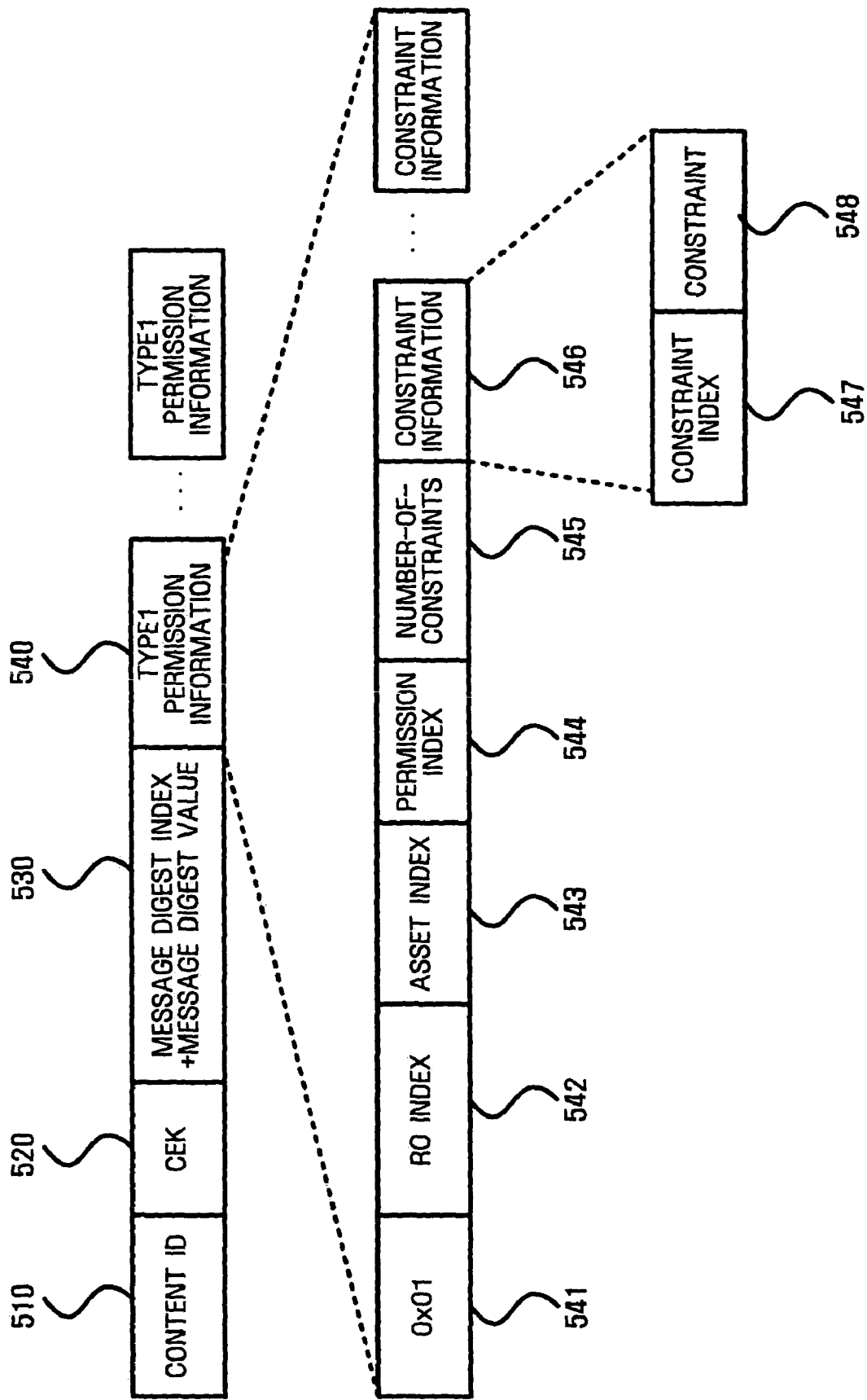
FIG. 5 illustrates a current permission status format (CPSF) according to an exemplary embodiment of the present invention.
Figure 6:
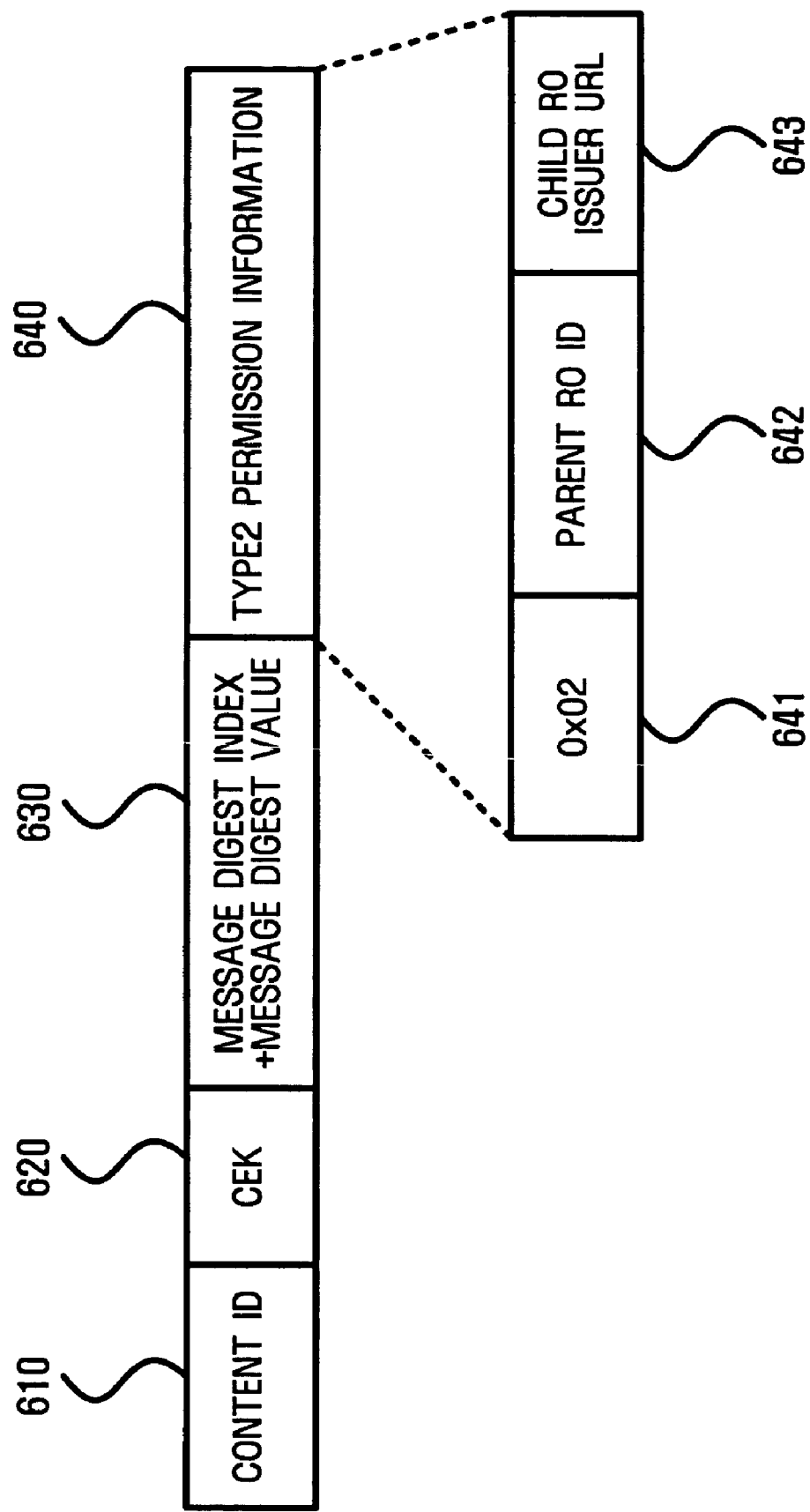
FIG. 6 illustrates a CPSF according to another exemplary embodiment of the present invention.
Figure 7:
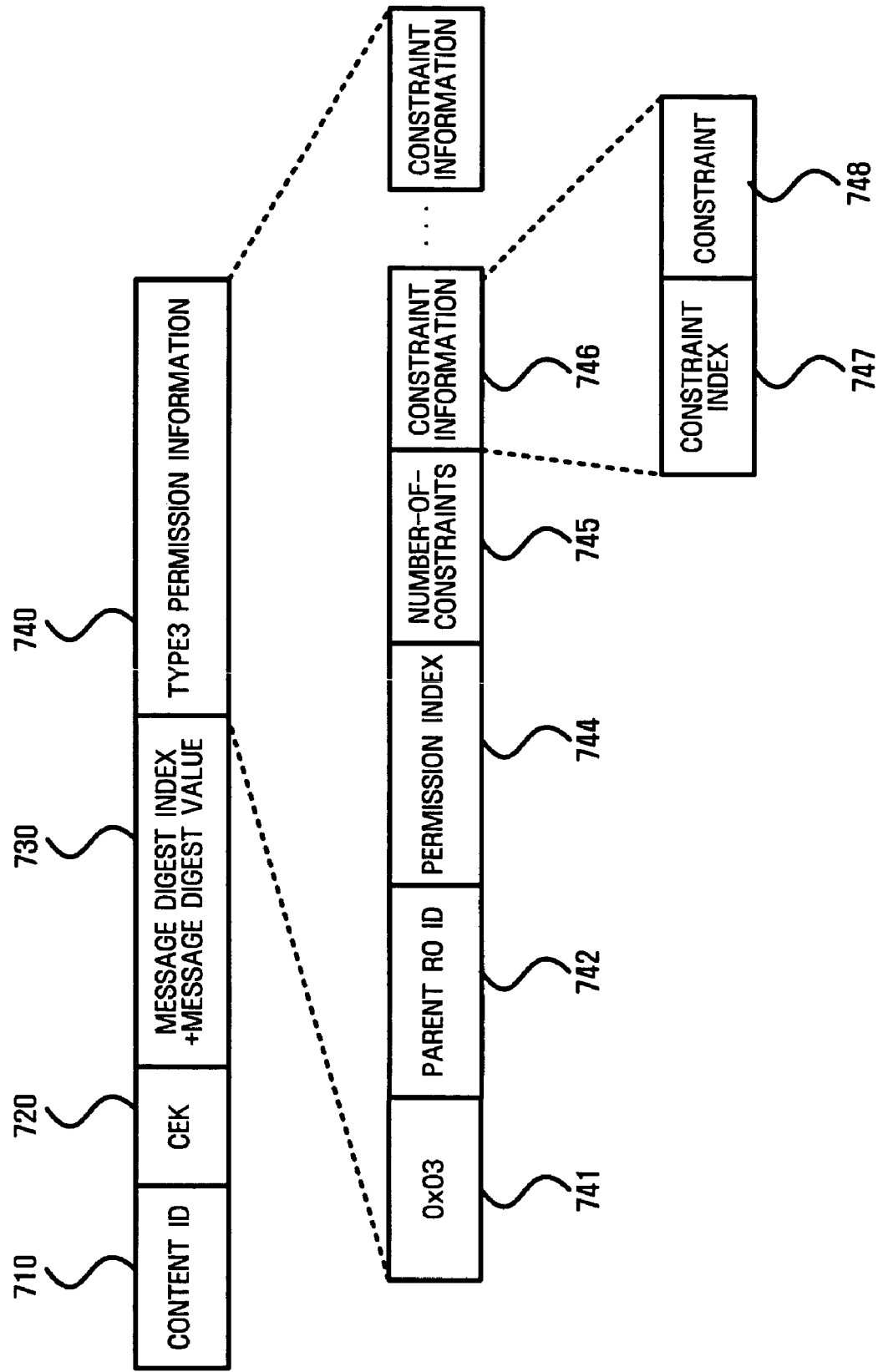
FIG. 7 illustrates a CPSF according to still another exemplary embodiment of the present invention.

FIGS. 5 through 7 illustrate current permission status formats (CPSFs) according to various exemplary embodiments of the present invention.

A data format including basic information for identifying an RO and permission information of the RO is referred to as a CPSF. A permission status format specifies all types of permission requested of an RO and basic information regarding the RO. In an exemplary embodiment of the present invention, an RO is not directly transmitted, but a CPSF is transmitted, thereby reducing unnecessary overhead between a device and a secure MMC.

A CPSF according to an exemplary embodiment of the present invention includes a content ID field 510, 610, or 710, a CEK field 520, 620, or 720, a message digest index+message digest value field 530, 630, or 730, and a permission information field 540, 640, or 740.

In the content ID field 510, 610, or 710, a content ID for identifying particular content that can be used via the RO is set.

In the CEK field 520, 620, or 720, a CEK value for decrypting encrypted content is set. A device can use the content by receiving the CEK value.

In the message digest index+message digest value field 530, 630, or 730, message digest information, which indicates a hash value for protecting integrity of a reference to the content, is set. The message digest value is a value generated by a public hash algorithm, e.g., a security hash algorithm1 (SHA1).

In the permission information field 540, 640, or 740, permission information possessed by the RO is set.

The content of a CPSF may vary with a type of RO. In exemplary embodiments of the present invention, types of ROs are divided into general RO types, child RO types, and parent RO types. Type1 indicates a general RO. Type2 indicates a child RO. Type3 indicates a parent RO.

General ROs are ROs that have no relations with a subscription model (or a subscription business model) described in open mobile alliance (OMA) DRM v2.0 rights expression language (REL).

ROs corresponding to the subscription model described in the OMA DRM v2.0 REL may be divided into child ROs and parent ROs. A child RO includes a CEK that is a right to play back encrypted content. A parent RO includes a permission item and a constraint for the permission item. Other details of child ROs and parent ROs are described in the OMA DRM v2.0 REL. The details of the OMA DRM can be obtained at http://www.openmobilealliance.org/.

FIG. 5 illustrates a CPSF for a general RO according to an exemplary embodiment of the present invention.

The CPSF of a general RO may include at least one permission information field 540, which includes subfields: a type field 541, an RO index field 542, an asset index field 543, a permission index field 544, a number-of-constraints field 545, and a constraint information field 546.

The type field 541 includes information for identifying a type of the RO. Table 3 shows types of ROs.

TABLE 3

| Type of RO | Identification information (1 byte) |
|---|---|
| General RO | 0x01 |
| Child RO | 0x02 |
| Parent RO | 0x03 |

The RO index field 542 and the asset index field 543 include an internal RO ID and an internal asset ID, respectively, in a secure MMC. The internal RO ID and the internal asset ID may be respectively used to identifying an RO and an asset stored in the secure MMC.

The permission index field 544 includes identification information for identifying a type of permission. The types of permission have been described with reference to Table 1.

The number-of-constraints field 545 includes the number of constraint information fields 546. Each constraint information field 546 includes a constraint index field 547 indicating a type of a constraint and a constraint field 548 indicating the constraint. The types of constraints have been described with reference to FIG. 4.

FIG. 6 illustrates a CPSF for a child RO according to an exemplary embodiment of the present invention.

Since only one child RO can be used for particular content, the CPSF includes a single permission information field.

Values respectively set in the content ID field 610, CEK field 620, and the message digest index+message digest value field 630 have been described above.

The permission information field 640 includes subfields: a type field 641, a parent RO ID field 642, and a child RO issuer URL field 643.

The type field 641 includes identification information for identifying a type of the RO and has a value of "0x02".

The parent RO ID field 642 includes identification information for identifying a parent rights object. The child RO issuer URL field 643 includes a URL of a child RO issuer.

FIG. 7 illustrates a CPSF for a parent RO according to an exemplary embodiment of the present invention.

The content ID field 710 has been described above. However, the parent RO complying with the subscription model described in the OMA DRM v2.0 REL does not have a CEK and a message digest value, and therefore, the CEK value field 720 and the message digest index+message digest value field 730 may be set to null.

Since there is only one parent RO allowing particular DRM content to be used, the CPSF includes a single permission information field 740.

The permission information field 740 includes subfields: a type field 741, a parent RO ID field 742, a permission index 744, a number-of-constraints field 745, and a constraint information field 746.

The type field 741 includes identification information for identifying a type of the RO and has a value of "0x03".

The parent RO ID field 742 includes identification information for identifying the parent rights object.

The permission index field 744, the number-of-constrains field 745, and the constraint information field 746, including a constraint index field 747 and a constraint 748 field, have been described above.

Meanwhile, a secure MMC may include both of a general RO and a child RO that allow particular content to be played back or both of a general RO and a parent RO that allow particular content to be played back.

Figure 8:
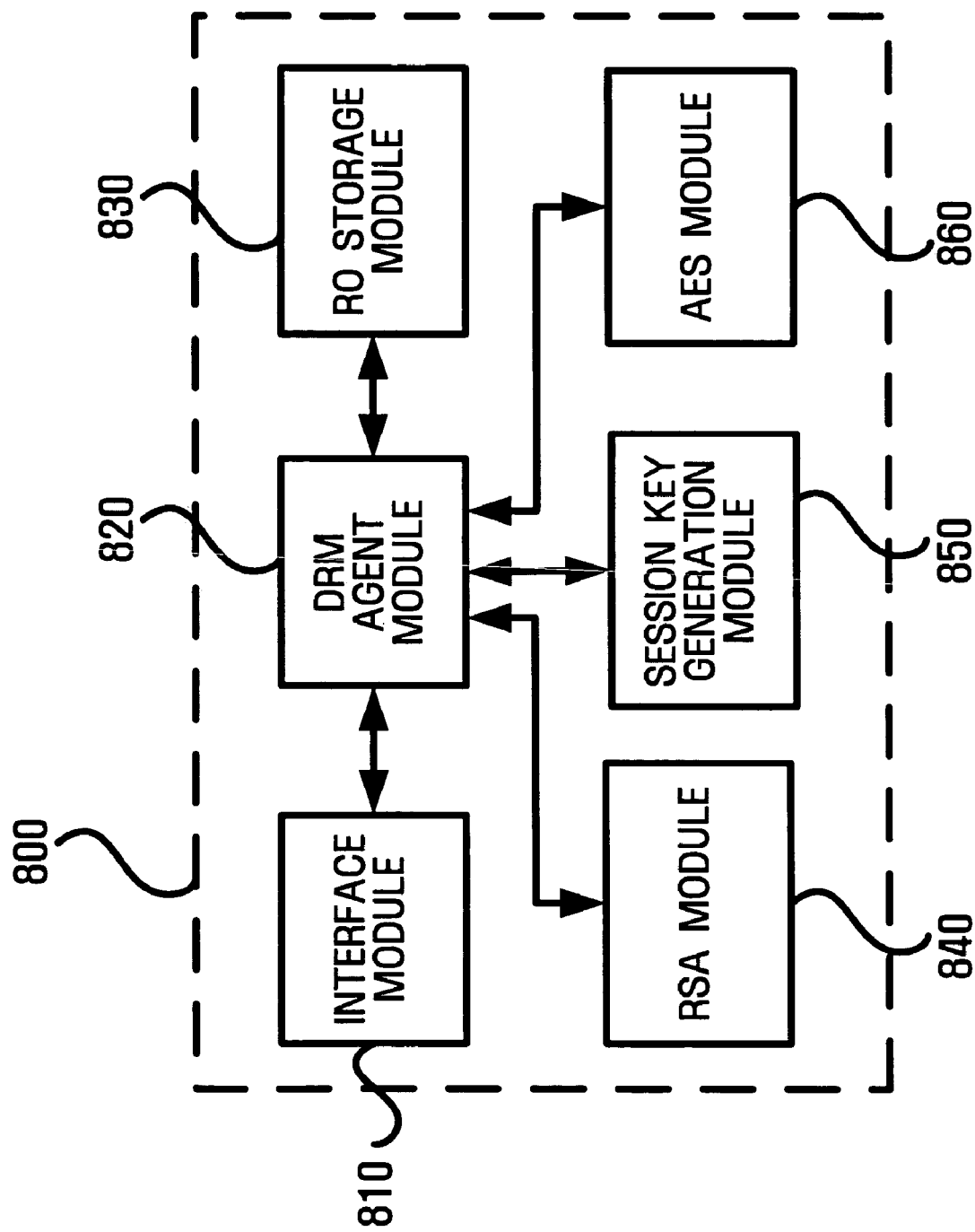
FIG. 8 is a block diagram of a secure multimedia card (MMC) according to an exemplary embodiment of the present invention.

FIG. 8 is a block diagram of a secure MMC 800 according to an exemplary embodiment of the present invention.

In the exemplary embodiment, the term "module", as used herein, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

To implement a DRM procedure, the secure MMC 800 needs a security function, a function of storing content or a RO, a function of exchanging data with a device, and a DRM function. To perform these functions, the secure MMC 800 includes an RSA module 840, a session key generation module 850, and an advanced encryption standard (AES) module 860 that have an encryption function, an RO storage module 830 with a storage function, an interface module 810 allowing data exchange with the device, and a DRM agent module 820 controlling each module to perform DRM operations.

The interface module 810 allows the secure MMC 800 to be connected with the device. When the secure MMC 800 is connected with a device, fundamentally, the interface module 810 of the secure MMC 800 is electrically connected with an interface module of the device. However, the electrical connection is just an example, and the connection may indicate a state in which the secure MMC 800 can communicate with the device through a wireless medium without contact.

The RSA module 840 performs public-key encryption. More particularly, the RSA module 840 performs RSA encryption according to a request from the DRM agent module 820.

The session key generation module 850 generates a random number to be transmitted to the device and generates a session key using the generated random number and a random number received from the device. The random number generated by the session key generation module 850 is encrypted by the RSA module 840 and then transmitted to the device through the interface module 810.

The AES module 860 performs symmetric-key encryption using the generated session key. More particularly, the AES module 860 uses AES encryption to encrypt a content encryption key from an RO with the session key and to encrypt other important information during communication with device. In an exemplary embodiment of the present invention, the session key is used to encrypt an RO during move of the RO. The AES encryption is just an example, and other symmetric-key encryption such as DES encryption may be used.

The RO storage module 830 stores ROs. The ROs are stored in an SMRF format, which has been described above.

The DRM agent module 820 controls the above-described elements of the secure MMC 800 to perform DRM operations.

FIG. 9 is a block diagram of a device 900 according to an exemplary embodiment of the present invention.

To implement a DRM procedure, the device 900 needs a security function, a function of storing content or a RO, a function of exchanging data with secure MMC, a data transmit/receive function allowing communication with a contents issuer or a rights issuer, and a DRM function. To perform these functions, the device 900 includes an RSA module 940, a session key generation module 950, and an AES module 990 that have an encryption function, a content storage module 930 with a storage function, a interface module 910 allowing data exchange with a secure MMC, and a DRM agent module 920 controlling each module to perform the DRM procedure. In addition, the device 900 includes a transceiver module 960 for the data transmit/receive function and a display module 970 displaying played back content.

The transceiver module 960 allows the device 900 to communicate with a contents issuer or a rights issuer. The device 900 can obtain an RO or encrypted content from an outside through the transceiver module 960.

The interface module 910 allows the device 900 to be connected with a secure MMC. When the device 900 is connected with a secure MMC, fundamentally, the interface module 910 is electrically connected with an interface module of the secure MMC. However, the electrical connection is just an example, and the connection may indicate a state in which the device 900 can communicate with the secure MMC through a wireless medium without contact.

The RSA module 940 performs public-key encryption. More particularly, the RSA module 940 performs RSA encryption according to a request from the DRM agent module 920.

The session key generation module 950 generates a random number to be transmitted to the secure MMC and generates a session key using the generated random number and a random number received from the secure MMC. The random number generated by the session key generation module 950 is encrypted by the RSA module 440 and then transmitted to the secure MMC through the interface unit 910. Meanwhile, instead of generating the random number in the session key generation module 950, the random number may be selected from a plurality of random numbers provided in advance.

The AES module 990 performs symmetric-key encryption using the generated session key. More particularly, the AES module 990 uses AES encryption to encrypt a content encryption key from an RO with the session key and to encrypt other important information during communication with the secure MMC. The AES encryption is just an example, and other symmetric-key encryption such as DES encryption may be used.

The content storage module 930 stores contents protected through DRM. The content protected through DRM is encrypted using a content encryption key. To play back the content protected through DRM, the content encryption key is necessary. After playing back the content, the content is again encrypted to be stored.

The display module 970 visually displays the playback of content whose RO permits playback. The display module 970 may be implemented by a liquid crystal display (LCD) device such as a thin-film transistor (TFT) LCD device or an organic electroluminescent (EL) display device.

The DRM agent module 920 controls the above-described elements of the device 900 to perform DRM operations.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, in the exemplary embodiment illustrate in FIG. 3, the secure MMC 320 may encrypt the CEK using the device public key$_H$ instead of using the session key when transmitting the CEK to the device 310.

The present invention provides a specific procedure in which a device plays back content protected through DRM using a portable storage. Therefore, the device can play back the content protected through DRM using the present invention.

According to the present invention, the device exchanges simplified partial information of an RO instead of the whole RO with the portable storage to play back the content protected through DRM. As a result, communication overhead between the device and the portable storage can be reduced.

In addition, according to the present invention, while playing back the content protected through DRM, the device can check the status of the portable storage.

Moreover, according to the present invention, formalities for continuous use of an RO are defined, and therefore, the RO can be continuously used.

Further, when an RO in the portable storage is not used, a procedure for playing back using the portable storage can be finished.

What is claimed is:

1. A method of playing back content using a portable storage, the method comprising:
    requesting the portable storage to transmit a right to play back content protected through digital rights management (DRM);
    receiving the right to play back the content protected through DRM from the portable storage; and
    informing the portable storage of completion of a playback of the content protected through DRM using the right when the playback is completed,
    wherein the right to play back content comprises permission information which is included in and obtained from a rights object, and
    wherein the informing the portable storage of completion of a playback updates at least one constraint included in the rights object stored in the portable storage by transmitting only a portion of the rights object, and not the entire rights object, to the portable storage.

2. The method of claim 1, wherein data transmitted to the portable storage and data transmitted from the portable storage are data encrypted using symmetric-key encryption.

3. The method of claim 1, wherein data transmitted to the portable storage and data transmitted from the portable storage comprise a send sequence counter indicating a send sequence.

4. The method of claim 3, wherein an initial value of the send sequence counter is set using random numbers obtained through authentication between the portable storage and a device.

5. The method of claim 1, wherein the right to play back the content protected through DRM using the right comprises predetermined information for playing back the content protected through DRM among information comprised in the rights object for the content protected through DRM.

6. The method of claim 5, wherein the content protected through DRM is encrypted content, and the right to play back the content protected through DRM using the right comprises a content encryption key used to decrypt the encrypted content.

7. The method of claim 1, further comprising checking whether the portable storage is in an activation status.

8. The method of claim 7, wherein the checking comprises transmitting a random number to the portable storage, receiving the random number encrypted by the portable storage, and decrypting the encrypted random number.

9. The method of claim 8, wherein the random number is encrypted according to symmetric-key encryption using a session key.

10. The method of claim 1, wherein the informing the portable storage of the completion of the playback comprises reporting information regarding total constraints including a total count and a total amount of time used to play back the content protected through DRM.

11. A method of sending a right to play back content to a device from a portable storage, the method comprising:
    receiving a request to transmit the right to play back the content protected through digital rights management (DRM) from the device;
    transmitting the right to play back the content protected through DRM to the device in response to the request; and
    receiving a command to update a rights object for the content protected through DRM,
    wherein the right to play back content comprises permission information which is included in and obtained from the rights object, and
    wherein the command to update the rights object is a command to update at least one constraint included in the rights object stored in the portable storage by transmitting only a portion of the rights object, and not the entire rights object, to the portable storage.

12. The method of claim 11, wherein data transmitted to the device and data transmitted from the device are data encrypted using symmetric-key encryption.

13. The method of claim 11, wherein data transmitted to the device and data transmitted from the device comprise a send sequence counter indicating a send sequence.

14. The method of claim 13, wherein an initial value of the send sequence counter is set using random numbers obtained through authentication between the device and a portable storage.

15. The method of claim 11, wherein the right to play back the content protected through DRM comprises predetermined information for playing back the content protected through DRM among information comprised in the rights object for the content protected through DRM.

16. The method of claim 15, wherein the content protected through DRM is encrypted content, and the right to play back the content protected through DRM is a content encryption key used to decrypt the encrypted content.

17. The method of claim 11, wherein the command to update the rights object comprises information regarding constraints including a count and time used to play back the content protected through DRM.

18. The method of claim 11, further comprising allowing the device to check an activation status.

19. The method of claim 18, wherein the allowing of the device to check the activation status comprises receiving a random number from the device, encrypting the random number, and transmitting the encrypted random number to the device.

20. The method of claim 19, wherein the random number is encrypted according to symmetric-key encryption using a session key.

21. The method of claim 11, further comprising receiving a message which indicates completion of a playback of the content protected through DRM from the device, and includes information for checking integrity of a total amount of use of the rights object.

22. A portable storage comprising:
an interface module which connects to a device;
a rights object storage module which stores at least one encrypted rights object;
an encryption module which generates a session key and performs symmetric-key encryption and public-key encryption; and
a digital rights management (DRM) agent module which performs DRM operations,
wherein the DRM agent module finds a rights object for content among rights objects stored in the rights object storage module upon receiving a request to transmit a right to play back the content from the device through the interface module, encrypts information needed to play back the content among information comprised in the rights object using the encryption module, and sends the encrypted information to the device through the interface module,
wherein the right to play back content comprises permission information which is included in and obtained from the rights object, and
wherein the DRM agent module updates at least one constraint included in the rights object stored in the rights object storage module by receiving only a portion of the rights object, and not the entire rights object.

23. An apparatus for playing back content using a portable storage, the apparatus comprising:
an interface module which connects to the portable storage;
a content storage module which stores content protected through digital rights management (DRM);
an encryption module which generates a session key and performs symmetric-key encryption and public-key encryption; and
a DRM agent module which performs DRM operations,
wherein the DRM agent module requests a right to play back the content that is protected through DRM and stored in the content storage module from the portable storage via the interface module, receives an encrypted right to play back the content from the portable storage, decrypts the encrypted right to play back the content using the encryption module, and obtains a content encryption key,
wherein the right to play back content comprises permission information which is included in and obtained from a rights object, and
wherein after a playback of the content is completed, the DRM agent requests the portable storage to update at least one constraint included in the rights object stored in the portable storage by transmitting only a portion of the rights object, and not the entire rights object, to the portable storage.

24. A recording medium having a computer readable program recorded therein, the program for executing a method of playing back content using a portable storage, the method comprising:
requesting the portable storage to transmit a right to play back content protected through digital rights management (DRM);
receiving the right to play back the content protected through DRM from the portable storage; and
informing the portable storage of completion of a playback of the content protected through DRM using the right when the playback is completed,
wherein the right to play back content comprises permission information which is included in and obtained from a rights object, and
wherein the informing the portable storage of completion of a playback updates at least one constraint included in the rights object stored in the portable storage by transmitting only a portion of the rights object, and not the entire rights object, to the portable storage.

25. A recording medium having a computer readable program recorded therein, the program for executing a method of sending a right to play back content to a device from a portable storage, the method comprising:
receiving a request to transmit the right to play back the content protected through digital rights management (DRM) from the device;
transmitting the right to play back the content protected through DRM to the device in response to the request; and
receiving a command to update a rights object for the content protected through DRM,
wherein the right to play back content comprises permission information which is included in and obtained from the rights object, and
wherein the command to update the rights object is a command to update at least one constraint included in the rights object stored in the portable storage by receiving only a portion of the rights object, and not the entire rights object.

26. The method of claim 1, wherein the permission information comprises the at least one constraint.

27. The method of claim 11, wherein the permission information comprises the at least one constraint.

28. The portable storage of claim 22, wherein the permission information comprises the at least one constraint.

29. The apparatus of claim 23, wherein the permission information comprises the at least one constraint.

30. The recording medium of claim 24, wherein the permission information comprises the at least one constraint.

31. The recording medium of claim 25, wherein the permission information comprises the at least one constraint.

32. The method of claim 1,
wherein the rights object comprises a plurality of rights to play back content for a plurality of content,
wherein each right to play back content comprises permission information which has at least one constraint, and
wherein the portion of the rights object that is transmitted to the portable storage to inform the portable storage of completion of the playback includes one, but not all, of the plurality of constraints that are provided in the rights object.

33. The method of claim 11,
wherein the rights object comprises a plurality of rights to play back content for a plurality of content,
wherein each right to play back content comprises permission information which has at least one constraint, and
wherein the portion of the rights object that is transmitted to the portable storage to update the rights objects includes at least one, but not all, of the plurality of constraints that are provided in the rights object.

34. The portable storage of claim 22,
wherein the rights object comprises a plurality of rights to play back content for a plurality of content,
wherein each right to play back content comprises permission information which has at least one constraint, and
wherein the portion of the rights object that is received by the DRM agent module to update the rights objects includes at least one, but not all, of the plurality of constraints that are provided in the rights object.

35. The apparatus of claim 23,
wherein the rights object comprises a plurality of rights to play back content for a plurality of content,
wherein each right to play back content comprises permission information which has at least one constraint, and
wherein the portion of the rights object that is transmitted to the portable storage to update the rights objects includes at least one, but not all, of the plurality of constraints that are provided in the rights object.

36. The recording medium of claim 24,
wherein the rights object comprises a plurality of rights to play back content for a plurality of content,
wherein each right to play back content comprises permission information which has at least one constraint, and
wherein the portion of the rights object that is transmitted to the portable storage to update the rights objects includes at least one, but not all, of the plurality of constraints that are provided in the rights object.

37. The recording medium of claim 25,
wherein the rights object comprises a plurality of rights to play back content for a plurality of content,
wherein each right to play back content comprises permission information which has at least one constraint, and
wherein the portion of the rights object that is transmitted to the portable storage to update the rights objects includes at least one, but not all, of the plurality of constraints that are provided in the rights object.

* * * * *